(12) United States Patent
Chen

(10) Patent No.: US 6,473,864 B1
(45) Date of Patent: Oct. 29, 2002

(54) METHOD AND SYSTEM FOR PROVIDING POWER MANAGEMENT TO A PROCESSING SYSTEM

(75) Inventor: Hong-Yi Hubert Chen, Fremont, CA (US)

(73) Assignee: picoTurbo, Inc.

( * ) Notice: Subject to any disclaimer, the term of this patent is extended or adjusted under 35 U.S.C. 154(b) by 0 days.

(21) Appl. No.: 09/364,621

(22) Filed: Jul. 29, 1999

(51) Int. Cl.⁷ .................................................. G06F 1/26
(52) U.S. Cl. ...................... 713/300; 713/320; 365/236; 365/227
(58) Field of Search ............................... 713/300–340; 365/226–229

(56) References Cited

U.S. PATENT DOCUMENTS 5,664,147 A * 9/1997 Mayfield .................... 711/137
5,666,355 A * 9/1997 Huah et al. ................. 370/311

* cited by examiner

Primary Examiner—Ario Etienne
(74) Attorney, Agent, or Firm—Nixon & Vanderhye P.C.

(57) ABSTRACT

A method and system for controlling a program in a processor system is disclosed. The processor system includes processor, a normal memory and a fast memory. The method and system comprises partitioning the program into a performance critical portion and a non-critical portion; and storing the performance critical portion of the program into the fast memory. The method and system further includes storing the non-critical portion in the normal memory, and causing the processor to execute the performance critical portion and non-critical portions at the appropriate time. Accordingly, through the use of the present invention power is conserved in the processing system when executing a program.

9 Claims, 5 Drawing Sheets

10

F    D    E    M    W

50

METHOD AND SYSTEM FOR PROVIDING POWER MANAGEMENT TO A PROCESSING SYSTEM

FIELD OF THE INVENTION

The present invention relates generally to a data processing system and more particularly to a processing system that includes power management.

BACKGROUND OF THE INVENTION

A processing system includes a plurality of pipeline stages. The pipeline stages of a processing system typically comprise a fetch (F) stage, a decode (D) stage, an execute (E) stage, a memory (M) stage, and a write back (W) stage. The processing system typically includes a general purpose processor. The general purpose processor includes a core processor and an instruction cache, data cache, and writeback device which are coupled to a bus interface unit.

Typically a program run on a processing system will be executed in a manner which accommodates overall speed and power. That is, if a program's fastest portion needs to run optimally at a certain speed, and this is critical to the operation of the program, then the entire program runs at this speed. This may consume excess power because some portions of the program may not require this speed of processing. On the other hand, if the program is optimized to run at some intermediate rate, then the program's performance critical portions may not execute efficiently.

Oftentimes, processors have modes for power management, such as the system management mode (SMM) of the Pentium® based processors. However, to provide for these special modes requires that the program be written to recognize these modes. Oftentimes this is not desirable or feasible in low cost processing environments.

Accordingly, what is needed is a system and method for efficiently managing the power in the processing system. The system and method must be efficient, easy to implement and cost effective. The present invention addresses such a need.

SUMMARY OF THE INVENTION

A method and system for controlling a program in a processor system is disclosed. The processor system includes processor, a normal memory and a fast memory. The method and system comprises partitioning the program into a performance critical portion and a non-critical portion; and storing the performance critical portion of the program into the fast memory. The method and system further includes storing the non-critical portion in the normal memory, and causing the processor to execute the performance critical portion and non-critical portions at the appropriate time. Accordingly, through the use of the present invention power is conserved in the processing system when executing a program.

DETAILED DESCRIPTION

The present invention relates to a data processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
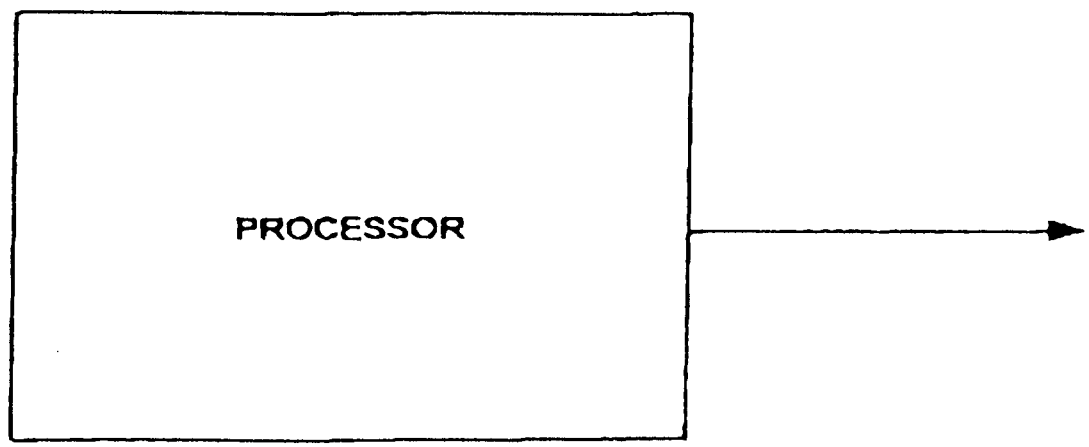
FIG. 1 is a simple block diagram of a processing system.

FIG. 1 is a simple block diagram of a processing system 10 in accordance with the present invention. The pipeline stages of the processing system 10 comprise a fetch (F) stage, a decode (D) stage, an execute (E) stage, a memory (M) stage and a write (W) stage.

Figure 2:
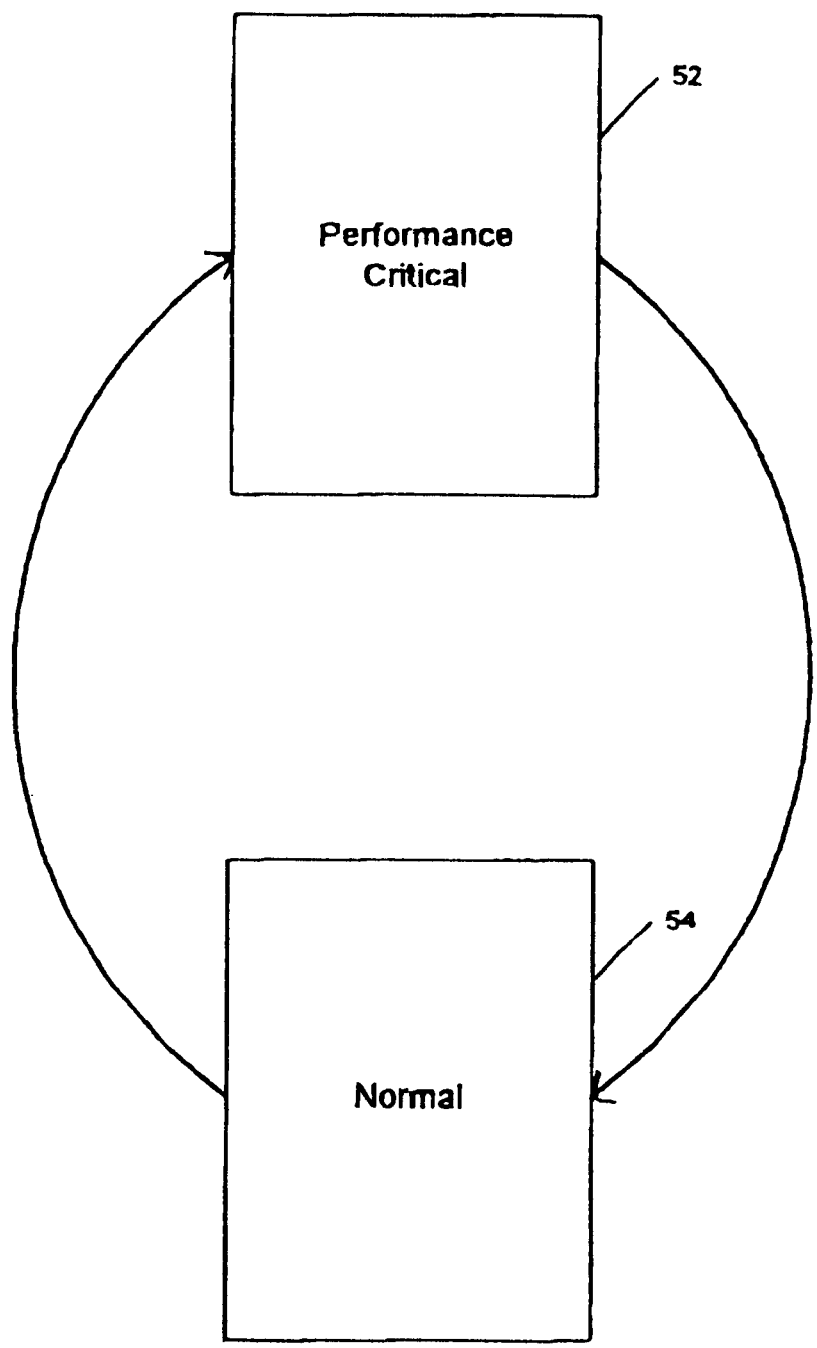
FIG. 2 is a conceptual representation of the features of the present invention.

FIG. 2 is a conceptual representation of the features of the present invention. A program 50 includes at least one performance critical portion 52 and a normal portion 54. That is, it is possible that there are portions of the program that are run at one speed because it is a performance critical portion, i.e., fast, where there are other portions of the program which can run at some non critical performance speed. Accordingly, in a preferred embodiment, the performance critical portion of the program is provided in one memory, for example, a fast SRAM, wherein a noncritical portion of the program is stored in a second memory or slower main memory.

Figure 3:
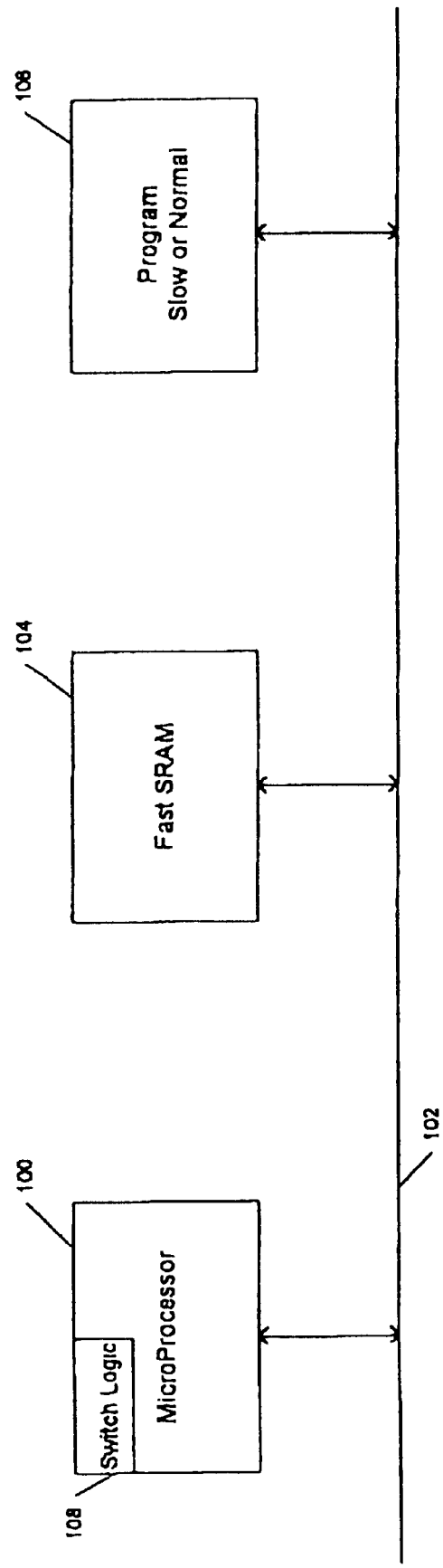
FIG. 3 illustrates a microprocessor system in accordance with the present invention.

Referring now to FIG. 3, what is shown is a microprocessor 100 which is coupled to a bus 102 which is then in turn coupled to the fast SRAM 104 and a main or normal memory 106. Within the microprocessor 100 there is typically switch logic 108 which allows the microprocessor 100 to switch between the fast SRAM 104 or normal memory 106. In so doing, the microprocessor 100 can operate in an optimal manner when executing instructions in either mode.

Figure 4:
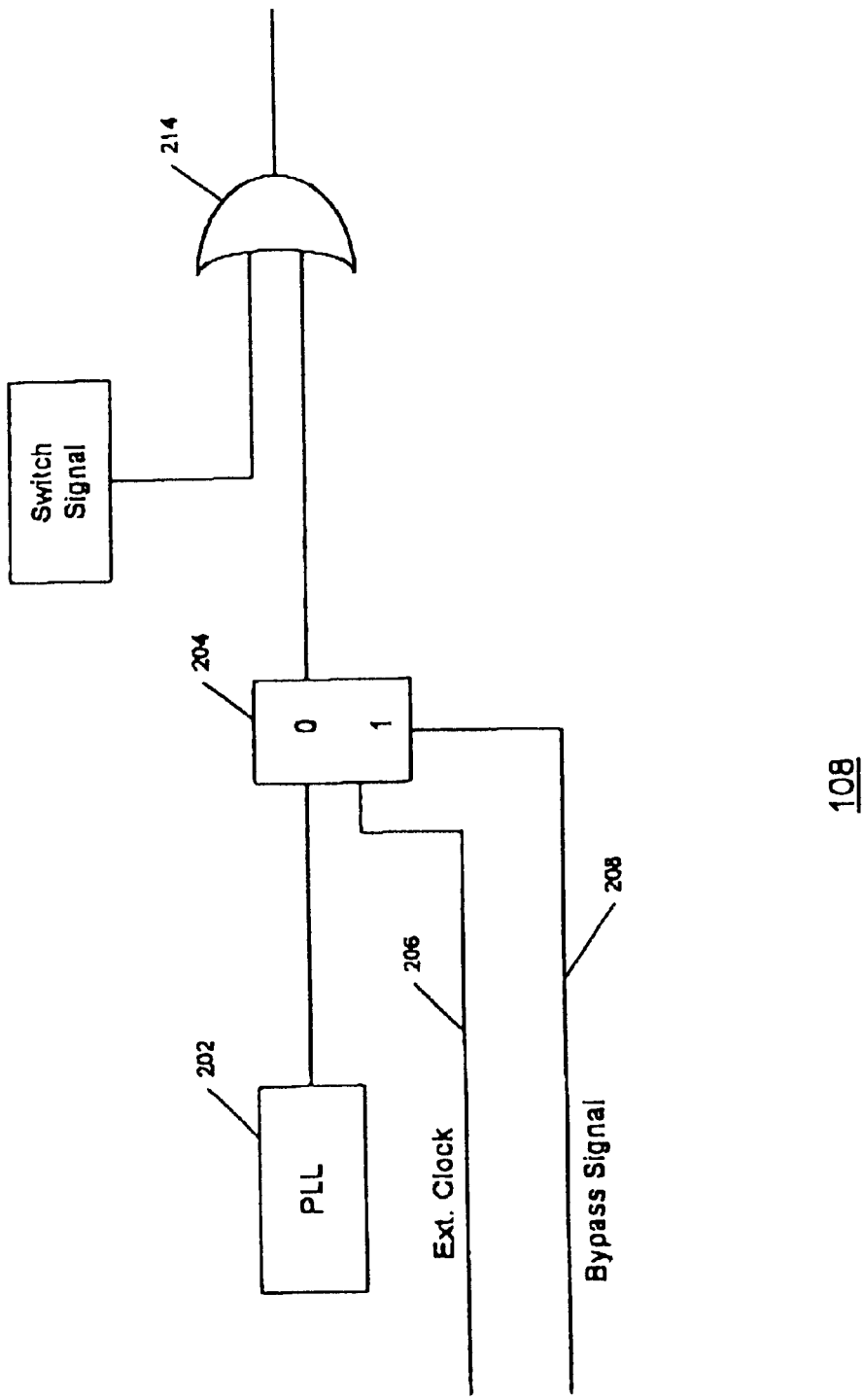
FIG. 4 is a block diagram of a switch logic circuit which would be utilized in the present invention.

FIG. 4 is a block diagram of a switch logic circuit 108 which would be utilized in the present invention. The switch logic preferably includes a phase lock loop 202 which provides a signal to a multiplexer 204. The multiplexer 204 also receives a clock signal 206 from the outside. The multiplexer 204 also receives a control signal via a bypass input 208. The bypass input 208 determines whether the phase lock loop 202 is utilized as the clocking signal or the external clock 206 is utilized as a clocking signal. The multiplexer provides one input to an OR gate 214. The OR gate 214 also receives a signal from a switch 216 which indicates whether the clock should be off or not, based on whether the performance critical portion of the code or a non-critical portion of the code. Accordingly, through this system, the processor can operate in an optimal fashion without the requirement of an additional system mode of a particular code embedded in the software to indicate that the processor should be shut down.

Figure 5:
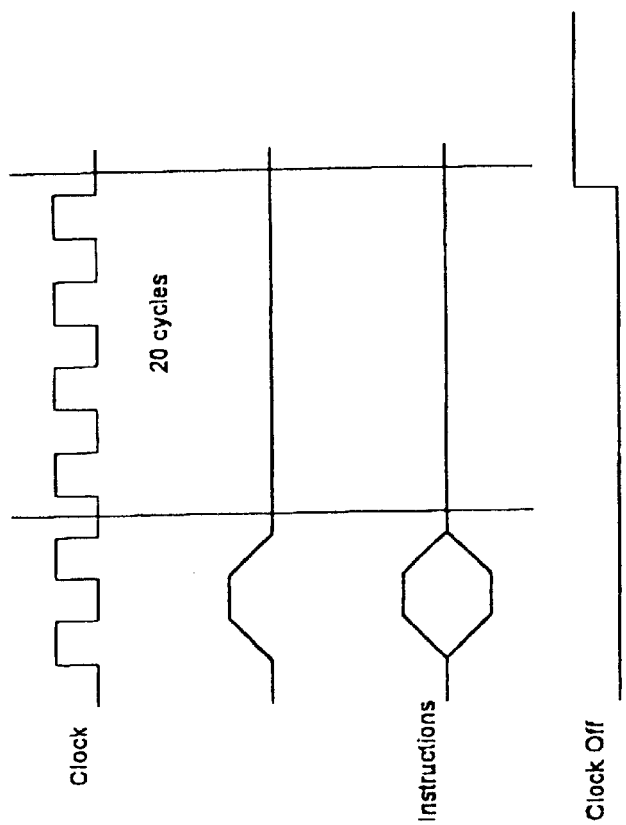
FIG. 5 illustrates a timing diagram in accordance with the present invention.

Accordingly, if the performance critical portion requires 0 wait states, and the non-critical performance portion requires 20 wait states, when a particular signal is provided by the switch logic 108, the microprocessor 100 can be shut down after an instruction from the non-critical portion of the processor has been executed in the normal memory 104. For example, since an instruction takes five cycles to provide data (F, D, E, M and W), then there is are 15 cycles after the execution of an instruction from the non-critical portion in which the microprocessor can be shut down, thereby conserving power (shown generally in the timing diagrams of FIG. 5).

Figure 6:
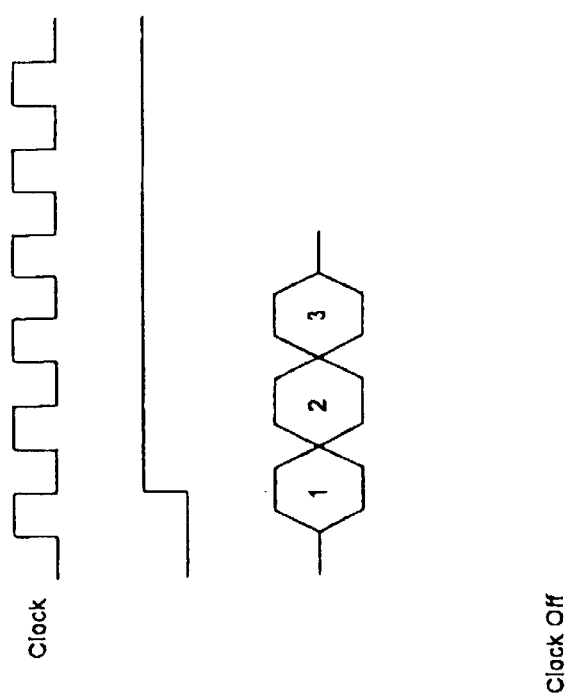
FIG. 6 illustrates a timing diagram in accordance with the present invention.

When the instruction from the performance critical portion is executed, from the fast memory in this example, there is 0 wait state after the instruction. As is understood, there will be no down time when running the performance critical portion of the code from the fast memory 104 (shown generally in the timing diagrams of FIG. 6). Accordingly, by using this system, the overall performance of the processor can be significantly increased, while adding minimal complexity to the overall processor architecture.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for controlling a program in a processor system, the processor system including processor, a normal memory and a fast memory; the method comprising the steps of:

(a) partitioning the program into a performance critical portion and a non-critical portion;

(b) storing the performance critical portion of the program into the fast memory;

(c) storing the non-critical portion in the normal memory; and (d) causing the processor to execute the performance critical portion and non-critical portion at the appropriate time based upon switch logic, wherein power is conserved in the processing system; wherein the causing step (d) further comprises:

(d1) providing a phase-locked loop (PLL) for providing a first clock signal;

(d2) providing an external clock for providing a second clock signal;

(d3) providing a multiplexer for receiving the first and second clock signals;

(d4) providing a bypass input signal for controlling whether the first or the second clock signal is provided from the multiplexer;

(d5) providing a gate coupled to the multiplexer at a first input and having an output; and (d6) providing a switch signal coupled to a second input of the gate indicating for whether the provided clock signal from the multiplexer should be on or off dependent upon whether the performance critical portion is to be executed.

2. The method of claim 1 in which the fast memory is an SRAM.

3. The method of claim 1 in which the normal memory is a main memory.

4. A system for controlling a program in a processor system, the processor system including processor, a normal memory and a fast memory; the method comprising the steps of:

means for partitioning the program into a performance critical portion and a non-critical portion;

means for storing the performance critical portion of the program into the fast memory;

means for storing the non-critical portion in the normal memory; and switch logic means for causing the processor to execute the performance critical portion and non-critical portion at the appropriate time; the switch logic means further comprising:

a phase-locked loop (PLL) for providing a first clock signal;

an external clock for providing a second clock signal;

a multiplexer for receiving the first and second clock signals;

a bypass input signal for controlling whether the first or the second clock signal is provided from the multiplexer;

a gate coupled to the multiplexer at a first input and having an output; and a switch signal coupled to a second input of the gate for indicating whether the provided clock signal from the multiplexer should be on or off dependent upon whether the performance critical portion is to be executed, wherein power is conserved in the processing system.

5. The system of claim 4 in which the fast memory is an SRAM.

6. The system of claim 4 in which the normal memory is a main memory.

7. A processor system comprising:

a processor;

a fast memory coupled to the processor, the fast memory containing a performance critical portion of a program;

a normal memory coupled to processor, the normal memory containing a non-critical portion of the program; and switch logic for causing the processor to execute the performance critical portion and the noncritical portion at the appropriate times, the switch logic further comprising:

phase-locked loop (PLL) for providing a first clock signal;

an external clock for providing a second clock signal;

a multiplexer for receiving the first and second clock signals;

a bypass input signal for controlling whether the first or the second clock signal is provided from the multiplexer, a gate coupled to the multiplexer at a first input and having an output; and a switch signal coupled to a second input of the gate indicating for whether the provided clock signal from the multiplexer should be on or off dependent upon whether the performance critical portion is to be executed, wherein power is conserved in the processing system.

8. The system of claim 7 which the fast memoryisan SRAM.

9. The system of claim 7 in which the normal memory is a main memory.

* * * * *